United States Patent
Thresh

(10) Patent No.: US 7,584,385 B2
(45) Date of Patent: Sep. 1, 2009

(54) METHOD AND SYSTEM FOR CUSTOMER SUPPORT

(75) Inventor: Donald Thresh, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 405 days.

(21) Appl. No.: 11/615,498

(22) Filed: Dec. 22, 2006

(65) Prior Publication Data

US 2008/0155522 A1  Jun. 26, 2008

(51) Int. Cl.
*G06F 11/00* (2006.01)
(52) U.S. Cl. ...................................... 714/38
(58) Field of Classification Search ............. 714/18, 714/25, 33, 37, 38, 46, 48, 57
See application file for complete search history.

(56) References Cited

U.S. PATENT DOCUMENTS

| | | | |
|---|---|---|---|
| 6,345,288 B1 * | 2/2002 | Reed et al. ............... | 709/201 |
| 6,757,837 B1 * | 6/2004 | Platt et al. ............... | 714/4 |
| 6,966,058 B2 * | 11/2005 | Earl et al. ............... | 717/171 |
| 2002/0128875 A1 * | 9/2002 | Parry ............... | 705/4 |
| 2002/0188938 A1 * | 12/2002 | Dong et al. ............... | 717/174 |
| 2006/0075001 A1 * | 4/2006 | Canning et al. ............... | 707/203 |
| 2006/0080653 A1 * | 4/2006 | Siwatu et al. ............... | 717/173 |
| 2006/0184928 A1 * | 8/2006 | Hughes ............... | 717/168 |

* cited by examiner

*Primary Examiner*—Nadeem Iqbal
(74) *Attorney, Agent, or Firm*—MH2 Technology Law Group LLP

(57) ABSTRACT

An embodiment generally relates to a method of software support. The method includes receiving a request for assistance for a selected device and analyzing an associated fault log for the selected device, where the associated fault log logging at least one fault. The method also includes determining at least one software release for the at least one fault.

16 Claims, 6 Drawing Sheets

METHOD AND SYSTEM FOR CUSTOMER SUPPORT

FIELD

This invention relates generally to customer support, more particularly, to methods and systems for automatic customer support notification of applicable software releases based on fault analysis.

DESCRIPTION OF THE RELATED ART

Manufacturers (or developers, suppliers, etc.) of devices such as network printers, copiers, software systems, etc. may be required to provide a customer support team for the users of the devices. A typical user may invest a large sum of money into the device for many years of use from the device. Sometimes, a user may pay additional sums of money for a service contract expecting the manufacturer to keep their respective devices current and functioning.

The manufacturer may also have a product development team (or group, division or the like) to develop new products as well to maintain existing product lines. The product development team may release software updates that correct known problems as well as the addition of new features.

However, the customer support team may struggle with how to get the most pertinent information and/or software from the product development team, especially, if there are multiple releases available. This may be a function of schedules of the two groups, a cultural artifact of the manufacturer, or other similar reason. For example, the product development team may deliver software updates quarterly to support users but may not forward the list of supported users and associated releases to the customer support team for another six months. As a result, the customer support team may not be familiar with newer software updates that correct existing problems. Accordingly, there is a need for a method and system for updating the customer support team with the latest software releases.

SUMMARY

An embodiment generally relates to a method of software support. The method includes receiving a request for assistance for a selected device and analyzing an associated fault log for the selected device, where the associated fault log logging at least one fault. The method also includes determining at least one software release for the at least one fault.

Another embodiment generally pertains to a system for customer support. The system includes a database configured to store information associating a plurality of software releases with respective faults and an advisor module configured to interface with the database. The advisor module is configured to receive a fault log from a selected device, where the fault log containing at least one fault. The advisor module is also configured to determine a recommended software release based on the at least one fault.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems that execute multiple applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to methods and systems for assisting customer support teams. More particularly, a software advisor may be configured to receive fault logs from devices. The devices may be copiers, scanners, printers, multi-functional devices and the like. The devices may be networked to the software advisor through private data networks, public data networks and/or combinations thereof to receive the fault logs of the supported devices. The software advisor may also be configured to store information related to software release and associated faults. For example, a 3.1 software release for a network color scanner model number X123 may correct a single or a small number of faults related to color mapping.

Accordingly, when a customer support team member answers a call from a supported user of a malfunctioning device, the team member may access the software advisor module. The software advisor module may have already received fault log from the defective machine. Alternatively, the software advisor module may query the defective machine for the fault log. The software advisor module may then analyze the received fault log and associated software releases for the recorded faults.

Figure 1:
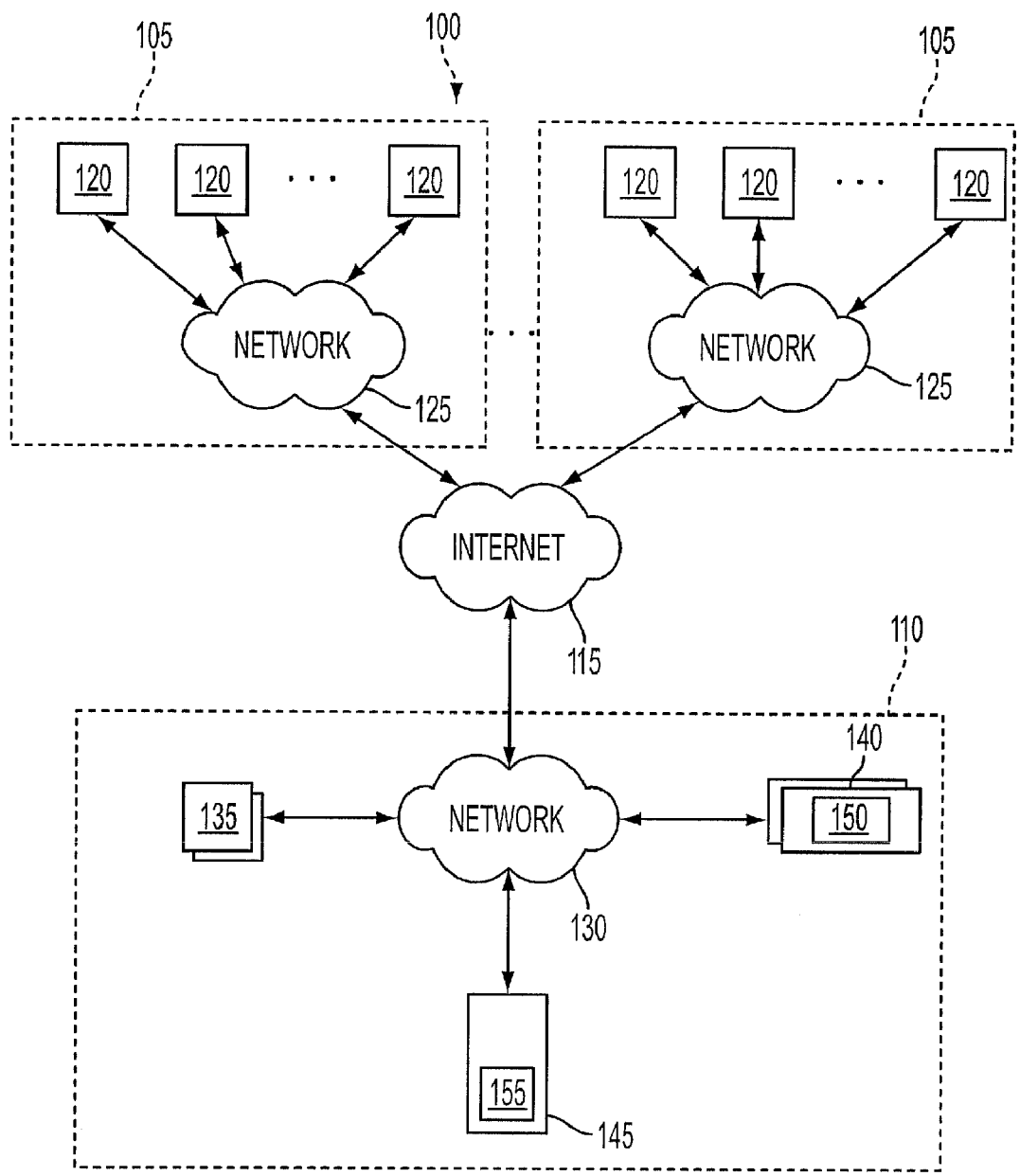
FIG. 1 illustrates an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a plurality of entities 105 connected with a manufacturer/developer/supplier entity ("supplier") 110 via the Internet 115. Each entity 105 may be a business entity, academic institution or other similar entity. Each entity 105 may include multiple devices 120 interconnected by a private data network 125.

Figure 2:
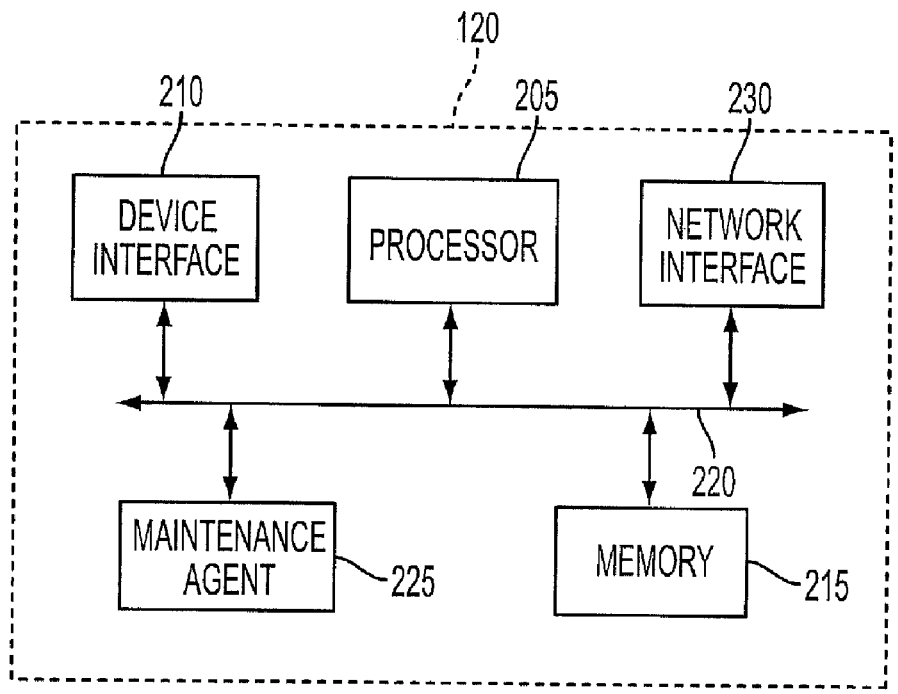
FIG. 2 illustrates a more detailed diagram of a device in accordance with another embodiment.

Each device 120 may be accessed and managed by a server (not shown) of an entity using Simple Network Management Protocols ("SNMP"), HyperText Transfer Protocols ("HTTP") protocols or a combination thereof over the respective private data network 125. The device 120 may be an imaging device such as a printer, copier, scanner, etc., a software system such as middleware, accounting software, etc., or application/device produced and supported by the supplier 110. FIG. 2 illustrates an exemplary block diagram of the device 120 in accordance with another embodiment.

As shown in FIG. 2, each device 120 may include a processor 205, a device interface 210, a memory 215 and a bus 220. The processor 205 may be configured to execute a computer program embodiment of the functionality of the device 120. The processor 205 may retrieve the computer program from the memory 215 over the bus 220 during boot-up. The processor 205 may control and manage the device 105 through the device interface 210. The device 120 may be a copier, printer, scanner, or other similar imaging device.

The processor 205 may also interface with a maintenance agent or applet 225. The maintenance agent 225 may be configured to log or record faults that occur during the operation of the device 120 in the memory 215 as a fault log. The maintenance agent 225 may also be configured to periodically forward the fault log to the supplier of the device 120 (e.g. supplier 110) through the network interface 230. The fault log may contain information such as the error code of a fault, the time of occurrence, the serial number of the device 120, current software version of the device, etc. Alternatively, the supplier 110 may query the maintenance agent 225 for the fault log using SNMP commands, HTTP commands or combinations thereof to retrieve the fault log.

Returning to FIG. 1, the devices 120 may provide their respective fault logs to the supplier 110 through their respective network interfaces 230. The private data networks 125 may connect to a supplier network 130 via the Internet 115. The supplier network 130 may be configured to interconnect at least one product development client 135, at least one customer support client 140, and the customer support server 145. The supplier network 130 may be implemented as a local area network using network protocols such as Ethernet, FDDI, token ring, or other similar network protocols.

The product development client 135 may be configured to provide a computing platform where product development team members develop solutions for existing faults with currently released software and/or products as well as develop new software and/or products. One of the product development clients 135 may be configured to send a software release update to the customer support server 145. The software release update may contain information such as a tracking number (e.g., version number), device, application notes, i.e., what faults are corrected by the software release when a software release is about to be released to the users.

The customer support client 140 may be configured to provide a computing platform to assist customer support team members to assist supported users with faults, questions or issues. More specifically, the customer support client 140 may, among other things, execute a client version of a software advisor module 150. The software advisor module 150 may be configured to provide an interface to the server software advisor 155. The server software advisor 155 may be configured to analyze a fault log of a selected device and automatically determine the appropriate software releases based on the faults in the fault log.

The customer support server 145 may be configured to provide services to the customer support clients 140. The services may include applications needed by the customer support team members, data, etc. The customer support server 145 may also execute an instance of a server software advisor 155, as illustrated in FIG. 3.

Figure 3:
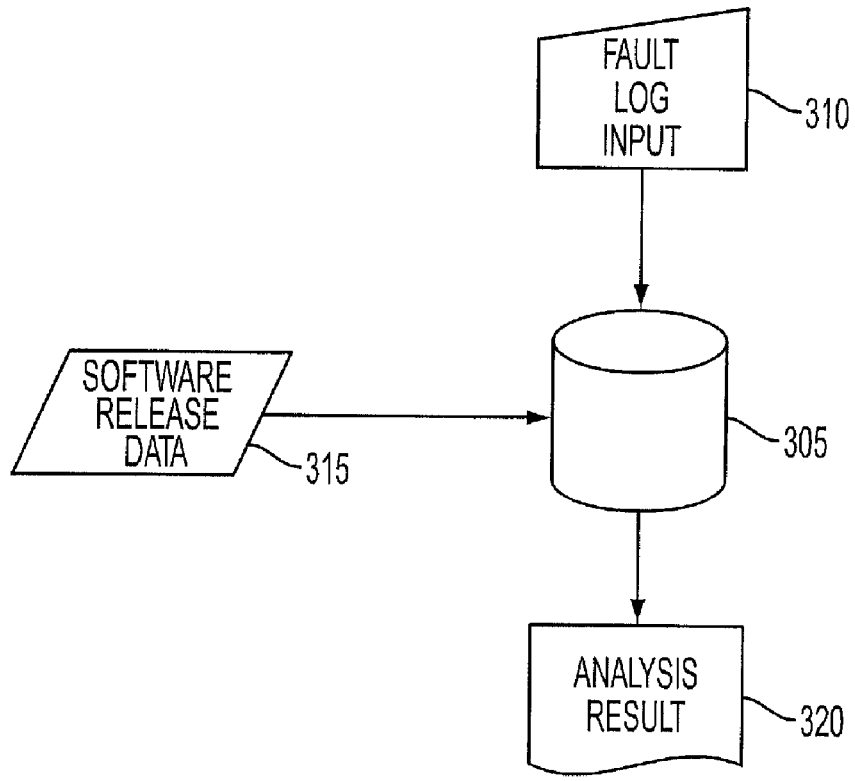
FIG. 3 illustrates view of a software advisor module in accordance with another embodiment.

FIG. 3 illustrates a more detailed diagram of the server software advisor 155 in accordance with yet another embodiment. It should be readily apparent to those of ordinary skill in the art that the server software advisor 155 depicted in FIG. 3 represents a generalized schematic illustration and that other components may be added or existing components may be removed or modified.

As shown in FIG. 3, the server software advisor 155 may include a database 305. The database 305 may store, among other things, information related to software releases. More particularly, a selected software release may be associated with a device (or a family of devices), an operating system, a version of the basic input/output system ("BIOS"), a date, list of faults that are corrected, a list of new features, or other similar information. Collectively, this information may be aggregated as the software release data 315 in these embodiments. The software release data 315 may be provided by member(s) of the product develop team.

The database 305 may also be configured to receive queries from the customer support clients 140. More particularly, a supported user may call the customer support team member at a customer support client 140. The customer support team member may assist the supported user, among other things, to resolve any errors or defaults the supported user may have received. The customer support team member may retrieve a fault log from the selected device or from the database 305, which may receive and store periodic fault logs from supported devices 120. Accordingly, a database engine (not shown) may generate an analysis result 320 based on the fault log 310 input. The analysis result 320 may provide a listing of any relevant software releases associated with the faults listed in the fault log 310. Thus, the customer support team member may assist the user by ensuring that the user has the latest updated software.

Figure 4:
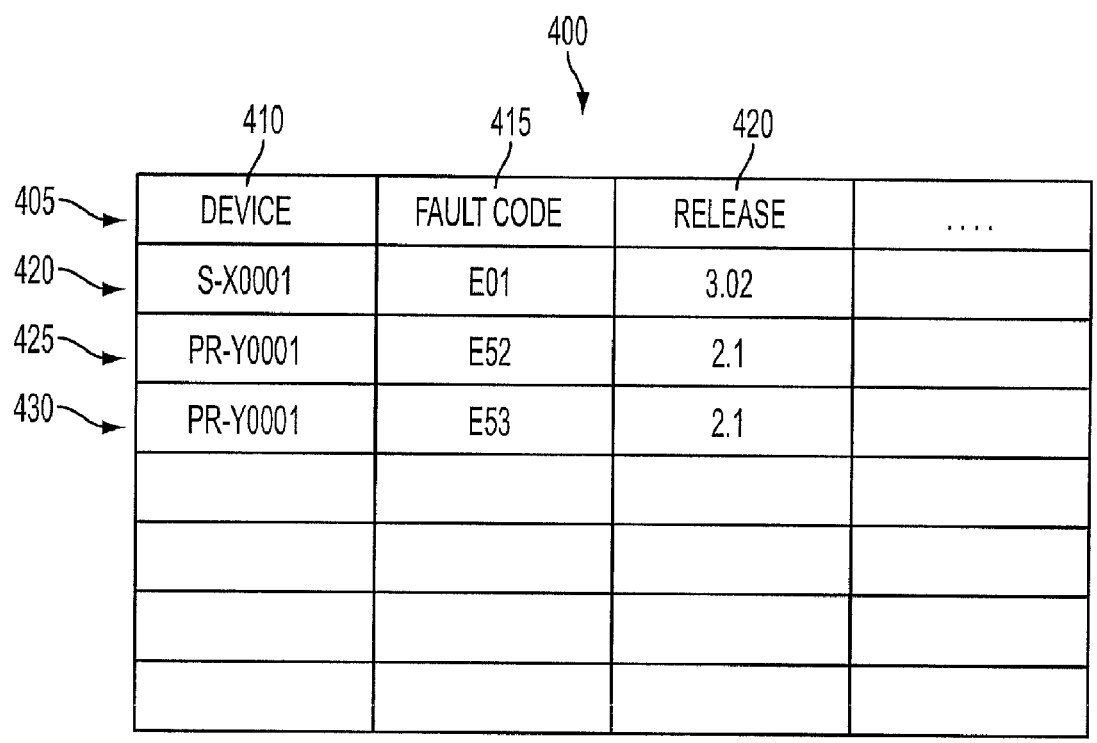
FIG. 4 illustrates an exemplary database schema implemented by the software advisor module in accordance with yet another embodiment.

FIG. 4 illustrates a database schema 400 that may be implemented by the database 305 in accordance with yet another embodiment. It should be readily apparent to those of ordinary skill in the art that the database schema 400 depicted in FIG. 4 represents a generalized illustration and that other elements may be added or existing elements may be removed or modified.

As shown in FIG. 4, database schema 400 may include record 405 with the data elements of device 410, a fault code 415, and a release version 420. Other data elements may also include version of BIOS, date of the release, etc. The device 410 represents the model number of a device targeted by a software release. The fault code 415 represents the error or failure that the software release is correcting. The release version 420 represents the version of the software. Records 420, 425, and 430 represent instances of records in the database schema 400.

Figure 5:
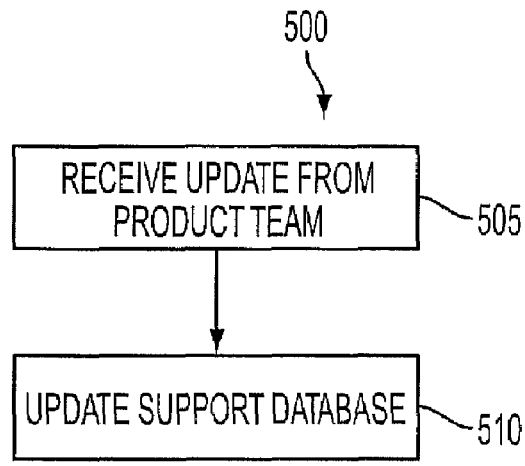
FIG. 5 illustrates an exemplary flow diagram implemented by the software advisor module in accordance with yet another embodiment.

FIG. 5 illustrates a flow diagram 500 implemented by the system 100 in accordance with yet another embodiment. It should be readily apparent to those of ordinary skill in the art that the flow diagram 500 depicted in FIG. 5 represents a generalized schematic illustration and that other steps may be added or existing steps may be removed or modified.

As shown in FIG. 5, the database 305 may be configured to receive an update (e.g., a software release data 315) from a product team development member, in step 505. The software release data 315 may be in a predetermined format that includes information such as the model number of the device(s) targeted by the software, the release or version number, and a name of the software release. In step 510, a database engine may be configured to update the database schema 400 with the information from the received software release data 315.

Figure 6:
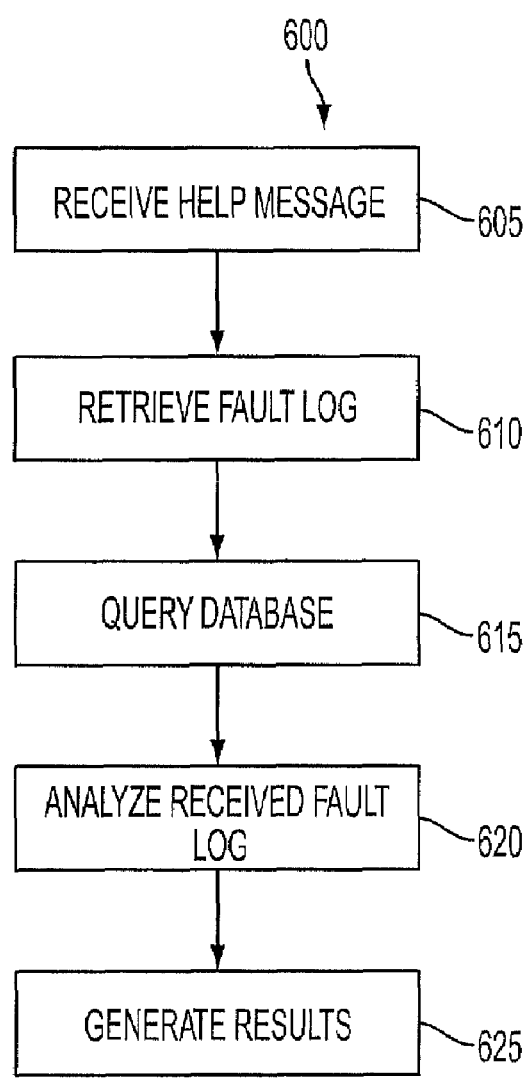
FIG. 6 illustrates another exemplary flow diagram implemented by the software advisor module in accordance with yet another embodiment.

FIG. 6 illustrates a flow diagram 600 implemented by the server software advisor 155 in accordance with yet another embodiment. It should be readily apparent to those of ordinary skill in the art that the flow diagram 600 depicted in FIG. 6 represents a generalized schematic illustration and that other steps may be added or existing steps may be removed or modified.

As shown in FIG. 6, a customer support team member may receive a help message from a supported user that a device 105 may be malfunctioning, in step 605. More specifically, the message may be in a form of a telephone call or an electronic mail message.

In step 610, the customer support team member may retrieve the fault log for the selected device 105. In some embodiments, the customer support team member may query the selected device 105 for the recent fault log using SNMP or HTTP protocols. Alternatively, the selected device 105 may periodically transmit its fault log to the database 305. Accordingly, the customer support team member may receive the fault log from the database 305.

In step 615, the customer support team member may formulate a query with the data from the fault log and submit to the server software advisor 155. The server software advisor 155 may then analyze the inputted faults with the faults stored in the database 305, in step 620.

Figure 7:
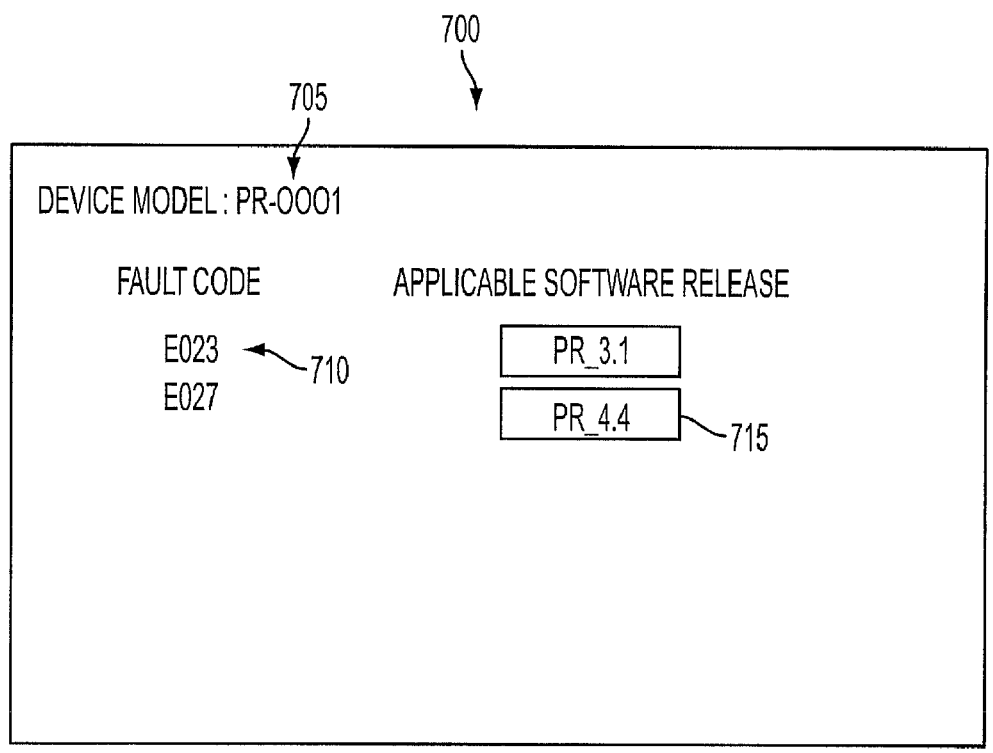
FIG. 7 illustrates an exemplary user interface in accordance with yet another embodiment.

In step 625, the server software advisor 155 may output a result showing any relevant software releases for the inputted faults. More specifically, the server software advisor 155 may generate a user interface at a customer support client 140 that displays this information as shown in FIG. 7. As shown in FIG. 7, user interface 700 shows the applicable device model field 705, a fault code field 710 and an applicable software release field 715. The fault code field 710 may indicate the fault code generated by the device 120. The applicable software release field 715 indicates a software release written for the fault code listed in fault code field 710. The listing of the software release in the applicable software release field 715 may be hypertext link to a location where a copy of the named software is stored. The customer support team member may transfer a copy of the named software to the user or install the named software. If there is not an applicable software release, the applicable software release field 715 may be left blank or a message such as "N/A".

Figure 8:
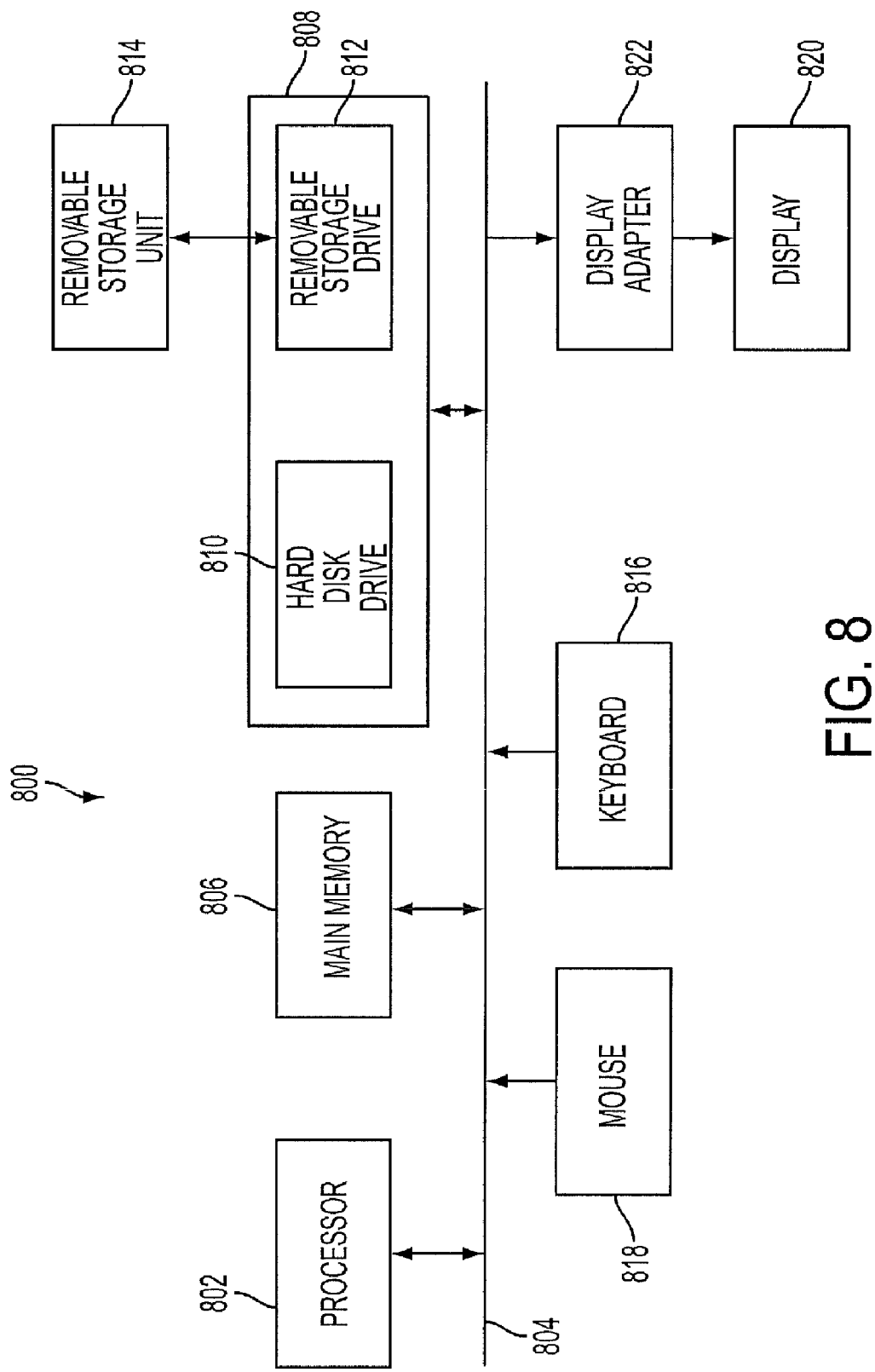
FIG. 8 illustrates an exemplary computing platform for executing the software advisor module.

FIG. 8 illustrates an exemplary block diagram of a computing platform 800 where an embodiment may be practiced. The functions of the server software advisor, customer support client, and product development client may be implemented in program code and executed by the computing platform 800. The server software advisor, customer support client, and product development client may be implemented in computer languages such as PASCAL, C, C++, JAVA, etc.

As shown in FIG. 8, the computer system 800 includes one or more processors, such as processor 802 that provide an execution platform for embodiments of the server software advisor, customer support client, and product development client. Commands and data from the processor 802 are communicated over a communication bus 804. The computer system 800 also includes a main memory 806, such as a Random Access Memory (RAM), where the server software advisor, customer support client, and product development client may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the server software advisor, customer support client, and product development client may be stored. The removable storage drive 812 reads from and/or writes to a removable storage unit 814 in a well-known manner. A user interfaces with the server software advisor, customer support client, and product development client with a keyboard 816, a mouse 818, and a display 820. The display adapter 822 interfaces with the communication bus 804 and the display 820, which receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of software support, the method comprising:
receiving a request for assistance for a selected device;
analyzing an associated fault log for the selected device, the associated fault log logging at least one fault;
determining at least one software release for the at least one fault; and
displaying a listing of the at least one software release.

2. The method of claim 1, further comprising:
forwarding the at least one software release to a user.

3. The method of claim 1, further comprising:
querying the selected device for the associated fault log; and
receiving the associated fault log.

4. The method of claim 1, further comprising:
receiving associated fault logs for a plurality of devices, each associated fault log containing at least one fault; at a predefined interval; and
storing the received associated fault logs.

5. The method of claim 4, further comprising:
receiving metadata associated with at least one software update, the metadata includes information of at least one identified fault that is repaired by the at least one software update; and
updating a database with the metadata associated with the at least one software update.

6. The method of claim 5, further comprising:
querying the database with at least one fault; and
retrieving the at least one software update associated with the at least one fault.

7. The method of claim 5, further comprising:
displaying a user interface that displays the at least one fault with a graphical link to the at least one software update.

8. An apparatus comprising of means for performing the method of claim 1.

9. A computer-readable medium comprising computer-executable instructions for performing the method of claim 1.

10. A system for customer support, the system comprising:
a database configured to store information associating a plurality of software releases with respective faults; and
an advisor module configured to interface with the database, wherein the advisor module is configured to receive a fault log from a selected device, the fault log containing at least one fault, determine a recommended software release based on the at least one fault, and display a listing of the recommended software release.

11. The system of claim 10, wherein the advisor module is configured to forward the recommended software release to a user.

12. The system of claim 10, wherein the advisor module is configured to query the selected device for the fault log and receive the associated fault log.

13. The system of claim 10, wherein the advisor module is further configured to receive associated fault logs for a plurality of devices, each associated fault log containing at least one fault; at a predefined interval, and storing the received associated fault logs in the database.

14. The system of claim 13, wherein the information of at least one identified fault that is repaired by the at least one software release, and wherein the advisor module updates the database with the information associated with the recommended software release.

15. The system of claim 14, wherein the advisor module is further configured to query the database with at least one fault and retrieve the recommended software release associated with the at least one fault.

16. The system of claim 15, wherein the advisor module is further configured to display a user interface that displays the at least one fault with a graphical link to the recommended software release.

* * * * *